United States Patent
Hong et al.

(10) Patent No.: US 8,512,905 B2
(45) Date of Patent: Aug. 20, 2013

(54) CATALYST SLURRY, ELECTRODE PREPARED BY USING THE CATALYST SLURRY, AND FUEL CELL INCLUDING THE ELECTRODE

(75) Inventors: Suk-gi Hong, Seongnam-si (KR); Jung-ock Park, Yongin-si (KR); Un-gyu Paik, Seoul (KR); Ki-chun Kil, Seoul (KR); Ji-hoon Seo, Seoul (KR)

(73) Assignees: Samsung Electronics Co., Ltd. (KR); Industry-University Cooperation Foundation Hanyang University (KR)

( * ) Notice: Subject to any disclaimer, the term of this patent is extended or adjusted under 35 U.S.C. 154(b) by 0 days.

(21) Appl. No.: 13/486,239

(22) Filed: Jun. 1, 2012

(65) Prior Publication Data
US 2012/0308912 A1    Dec. 6, 2012

(30) Foreign Application Priority Data
Jun. 2, 2011    (KR) ........................ 10-2011-0053367

(51) Int. Cl.
*H01M 8/10*    (2006.01)
(52) U.S. Cl.
USPC ........... 429/479; 502/100; 502/300; 502/182; 502/326; 502/159; 429/523
(58) Field of Classification Search
None
See application file for complete search history.

(56) References Cited

U.S. PATENT DOCUMENTS

| | | | |
|---|---|---|---|
| 6,821,677 B2 * | 11/2004 | Inagaki et al. | 429/221 |
| 7,718,304 B2 * | 5/2010 | Kang | 429/489 |
| 2010/0015514 A1 * | 1/2010 | Miyagi et al. | 429/129 |

FOREIGN PATENT DOCUMENTS

| | | |
|---|---|---|
| CN | 101567264 A | 10/2009 |
| JP | 2004311057 A | 11/2004 |
| JP | 2007005461 A | 1/2007 |
| JP | 2009181949 A | 8/2009 |
| JP | 2009231702 A | 10/2009 |
| KR | 1020090067262 A | 6/2009 |
| KR | 1020090116057 A | 11/2009 |

OTHER PUBLICATIONS

Winter, Martin; Brodd, Ralph, What Are Batteries, Fuel Cells, and Supercapacitors?, Sep. 28, 2004, Chemical Reviews, American Chemical Society, vol. 104, No. 10, pp. 4259, 4260.*

* cited by examiner

*Primary Examiner* — Patrick Ryan
*Assistant Examiner* — Christopher Domone
(74) *Attorney, Agent, or Firm* — Cantor Colburn LLP

(57) ABSTRACT

A catalyst slurry, an electrode prepared by using the same, and a fuel cell including the electrode. The catalyst slurry includes: a catalyst material; a binder; and a solvent including a first liquid for dissolving the binder and a second liquid having a viscosity that is higher than that of the first liquid.

10 Claims, 2 Drawing Sheets

CATALYST SLURRY, ELECTRODE PREPARED BY USING THE CATALYST SLURRY, AND FUEL CELL INCLUDING THE ELECTRODE

This application claims priority to and the benefit of Korean Patent Application No. 10-2011-0053367, filed on Jun. 2, 2011, and all the benefits accruing therefrom under 35 U.S.C. §119, the content of which is incorporated herein in its entirety by reference.

BACKGROUND

1. Field

The present disclosure relates to a catalyst slurry, an electrode prepared using the catalyst slurry, and a fuel cell including the electrode.

2. Description of the Related Art

Typically, an electrode for a fuel cell is prepared by using a catalyst material. An electrode for a fuel cell is prepared by mixing a catalyst material with a binder and a solvent to prepare a catalyst slurry, followed by coating the catalyst slurry on an electrode support. The catalyst material includes a catalyst metal and a carrier.

A catalyst slurry is industrially produced in a large scale and stored, and then, is used in preparing electrodes for a long period time. Accordingly, the catalyst slurry desirably has excellent storage stability: e.g., no occurrence of phase separation and maintenance of uniform composition even during long-term storage. However, in the case of a typical catalyst slurry, during long-term storage, a catalyst material may precipitate, and thus, a composition thereof becomes non-uniform. When an electrode is manufactured by using a catalyst slurry of which composition changes according to a storage time, it is difficult to manufacture an electrode having uniform performances in a large scale for a long period of time.

SUMMARY

Provided are catalyst slurries for a fuel cell, each including at least two liquids having different viscosities.

Provided are electrodes for a fuel cell, which are prepared by using the catalyst slurries.

Provided are fuel cells including the electrodes.

According to an aspect, a catalyst slurry includes: a catalyst material; a binder; and a solvent including a first liquid for dissolving the binder and a second liquid having a viscosity that is higher than that of the first liquid.

The catalyst material may include a carrier and a catalyst metal supported by the carrier.

The carrier may include at least one selected from carbon powder, carbon black, acetylene black, ketjen black, active carbon, carbon nanotube, carbon nanofiber, carbon nanowire, carbon nanohorn, carbon aerogel, carbon xerogel, and carbon nanoring.

The catalyst metal may include at least one selected from platinum (Pt), iron (Fe), cobalt (Co), nickel (Ni), ruthenium (Ru), rhodium (Rh), palladium (Pd), osmium (Os), iridium (Ir), copper (Cu), silver (Ag), gold (Au), tin (Sn), titanium (Ti), chromium (Cr) and an alloy of two or more of these.

The binder may include at least one selected from polyvinylidene fluoride (PVdF), polytetrafluoroethylene (PTFE), a vinylidenefluoride-hexafluoropropylene copolymer, and fluorine terminated phenoxide based hyperbranched polymer (HPEF).

A viscosity of the first liquid may be in a range of about 0.1 to about 10 cP (centipoise), and a viscosity of the second liquid may be in a range of about 10 to 100 cP.

A weight ratio of the second liquid with respect to the first liquid may be in a range of about 20/80 to about 1/99.

The second liquid may be a material that is miscible with the first liquid.

The second liquid may be a material that is not miscible with the first liquid.

The second liquid may be a material that dissolves the binder.

The second liquid may be a material that does not dissolve the binder.

The first liquid may include at least one selected from N-methylpyrrolidone (NMP), dimethylacetamide (DMAc), dimethylformamide (DMF), and trifluoroacetic acid (TFA).

The second liquid may include at least one selected from dihydroterpineol (DHT), and ethyleneglycol (EG).

The catalyst slurry for a fuel cell may further include a water-repellent material.

The water-repellent material may include at least one selected from a 2,2-bistrifluoromethyl-4,5-difluoro-1,3-dioxol tetrafluoroethylene copolymer, polytetrafluoroethylene (PTFE), fluorinated ethylene propylene (FEP), polyvinylidene fluoride (PVdF), and Fluorosarf®.

According to another aspect, there is provided an electrode for a fuel cell, wherein the electrode includes: an electrode support; and a catalyst layer disposed on the electrode support, wherein the catalyst layer is formed by using the catalyst slurry.

Regarding the electrode for a fuel cell, a volume of pores having a diameter of about 50 to about 100 μm may be in a range of about 5 to about 6 mL/g.

According to another aspect, there is provided an electrode for a fuel cell, wherein the electrode includes: a cathode; an anode; and an electrolyte membrane interposed between the cathode and the anode, wherein at least one of the cathode and the anode is the electrode described above.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
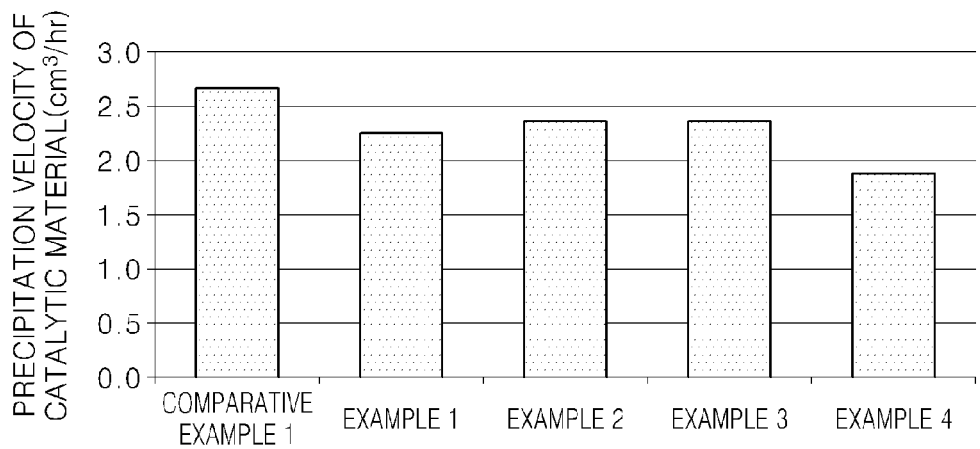
FIG. 1 is a graph of a precipitation speed of a catalyst material included in a catalyst slurry prepared according to Examples 1-4 and Comparative Example 1.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a catalyst slurry, an electrode prepared by using the catalyst slurry, and a fuel cell including the electrode, according to embodiments, are described in detail.

A catalyst slurry according to an embodiment includes a catalyst material, a binder, and a solvent including a first liquid for dissolving the binder and a second liquid having a viscosity that is higher than that of the first liquid. The 'solvent' of the 'the solvent including the first liquid and the second liquid' refers to a liquid composition having a function to dissolve a binder. That is, all of two or more liquids that constitute the 'solvent' do not necessarily need to have a capability of dissolving a binder, and the solvent may be any one of various solvent as long as a liquid component (for example, first liquid) having such an amount that may be enough to completely dissolve a binder included in the catalyst slurry, exists in the 'solvent'.

The catalyst material may include a carrier and a catalyst metal supported by the carrier.

The carrier may include at least one selected from carbon powder, carbon black, acetylene black, ketjen black, active carbon, carbon nanotube, carbon nanofiber, carbon nanowire, carbon nanohorn, carbon aerogel, carbon xerogel, and carbon nanoring.

The catalyst metal may include at least one selected from platinum (Pt), iron (Fe), cobalt (Co), nickel (Ni), ruthenium (Ru), rhodium (Rh), palladium (Pd), osmium (Os), iridium (Ir), copper (Cu), silver (Ag), gold (Au), tin (Sn), titanium (Ti), chromium (Cr), and an alloy of two or more of these. An amount of the catalyst metal may be in a range of about 10 to about 1,000 parts by weight based on 100 parts by weight of the carrier. When an amount of the catalyst metal is within this range, the utilization rate of the catalyst metal may be high, and performances of a formed fuel cell may be maintained at high levels.

The catalyst material may be, for example, an alloy of platinum and cobalt supported by carbon powder (PtCo/C).

The binder may include at least one selected from polyvinylidene fluoride (PVdF), polytetrafluoroethylene (PTFE), a vinylidenefluoride-hexafluoropropylene copolymer, and fluorine terminated phenoxide based hyperbranched polymer (HPEF). An amount of the binder may be in a range of about 1 to about 20 parts by weight based on 100 parts by weight of the catalyst material. When an amount of the binder is within this range, the catalyst layer may be formed easily, and performances of a formed fuel cell may be maintained at high levels.

The first liquid may dissolve and disperse the binder in the catalyst slurry.

The second liquid may prevent or reduce phase-separation that occurs due to precipitation of a catalyst material in the catalyst slurry, so as to improve storage stability of the catalyst slurry. That is, the second liquid may, as shown in Equations 1 and 2 below, increase the viscosity of a liquid material (that is, a binder solution) in the catalyst slurry to reduce a precipitation speed of the catalyst material and to increase a precipitation time.

$$v = [a^2(D_P - D_L)g]/[18\eta_L] \qquad \text{Equation 1}$$

$$t = [18H\eta_L]/[a^2(D_P - D_L)g] \qquad \text{Equation 2}$$

wherein, v is a precipitation speed of a catalyst material, a is a particle diameter of a catalyst material, $D_P$ is a particle density of a catalyst material, $D_L$ is the density of a liquid material, $\eta_L$ is the viscosity of a liquid material, g is a gravitational acceleration, t is a precipitation time, and H is a settling height.

A viscosity of the first liquid may be in a range of about 0.1 to about 10 cP, and a viscosity of the second liquid may be in a range of about 10 to about 100 cP. The term 'viscosity' used herein refers to a value measured by using a Brookfield viscometer at a temperature of 20° C. and a rotational speed of 20 rpm. When the viscosities of the first liquid and the second liquid are within these ranges, solubility and dispersibility of the binder are high, and a prepared catalyst slurry has excellent storage stability.

The first liquid may include at least one selected from N-methylpyrrolidone (NMP), dimethylacetamide (DMAc), dimethylformamide (DMF), and trifluoroacetic acid (TFA).

An amount of the first liquid may be in a range of about 100 to about 1,000 parts by weight based on 100 parts by weight of the catalyst material. When the amount of the first liquid is within this range, a catalyst layer may be easily formed.

A weight ratio of the second liquid with respect to the first liquid may be in a range of about 20/80 to about 1/99. When the weight ratio of the second liquid with respect to the first liquid is within this range, solubility and dispersibility of the binder are high and a prepared catalyst slurry has excellent storage stability.

The second liquid may be a material that is miscible with the first liquid. The second liquid may be, for example, dihydroterpineol (DHT) and/or ethyleneglycol (EG).

The second liquid may be a material that is not miscible with the first liquid.

The second liquid may be a material that dissolves the binder.

The second liquid may be a material that does not dissolve the binder. Such a second liquid may be, for example, dihydroterpineol.

The catalyst slurry may further include a water-repellent material. A water-repellent material may prevent "flooding" that may occur when a great amount of electrolyte flows into a catalyst layer in a fuel cell. In this regard, the "flooding" refers to a phenomenon in which a great amount of electrolyte hinders gas-diffusion into a catalyst layer.

The water-repellent material may include at least one selected from a 2,2-bistrifluoromethyl-4,5-difluoro-1,3-dioxol tetrafluoroethylene copolymer, polytetrafluoroethylene (PTFE), fluorinated ethylene propylene (FEP), polyvinylidene fluoride (PVdF), and Fluorosarf® (product name: manufactured by Fluoro Technology Company).

An amount of the water-repellent material may be in a range of about 1 to about 20 parts by weight, based on 100 parts by weight of the catalyst material. When an amount of the water-repellent material is within this range, flooding may not occur and performances of a formed fuel cell may be maintained at high levels.

An electrode for a fuel cell according to an embodiment may include an electrode support and a catalyst layer disposed on the electrode support, wherein the catalyst layer is formed by using the catalyst slurry described above.

The electrode support may be carbon paper or carbon cloth.

Regarding the electrode, a volume of pores having a diameter of about 50 to about 100 μm may be in a range of about 5 to about 6 mL/g. Such a large volume of pores having a particular size (that is, a diameter of about 50 to about 100 μm) seems a characteristic originated from the catalyst slurry (refer to FIG. 2).

The electrode for a fuel cell may be prepared by coating or printing the catalyst slurry on an electrode support, followed by drying the catalyst slurry to form a catalyst layer.

When the electrode for a fuel cell is prepared, the drying may not be particularly limited, and may be performed by general drying at a temperature of about 60 to about 150° C. or by freeze drying at a temperature of about −20 to about −60° C.

The electrode preparation method may further include treating the electrode with an acid solution, such as a phosphoric acid solution after the drying.

A fuel cell according to an embodiment includes a cathode, an anode, and an electrolyte membrane interposed between the cathode and the anode, wherein at least one of the cathode and the anode is the electrode described above.

The fuel cell may be, for example, a phosphoric acid fuel cell (PAFC), a proton exchange membrane fuel cell (PEMFC), or a direct methanol fuel cell (DMFC). The structure of and manufacturing method for these fuel cells are not particularly limited, and examples thereof are disclosed in various literatures in detail and thus, detailed description thereof are not be described herein.

Hereinafter, examples are described below, but this disclosure is not limited thereto.

EXAMPLES

Examples 1 to 4 and Comparative Example 1

Preparation Example 1

Preparation of Catalyst Slurry

PtCo/C (manufacturer: TANAKA Precious metal (Japan)), PVdF, NMP, and DHT were mixed at a ratio shown in Table 1 below, followed by stirring the resultant mixture at room temperature for 30 minutes to prepare catalyst slurry.

Preparation Example 2

Preparation of Electrode

The catalyst slurry prepared according to Preparation Example 1 was coated on a sheet of carbon paper by using a wire bar, and the resultant was dried at a temperature of 80° C. for 1 hour, at a temperature of 120° C. for 30 minutes, and at a temperature of 150° C. for 10 minutes, thereby completing the preparation of an electrode having a thickness of 390 μm.

Preparation Example 3

Preparation of Fuel Cell

A fuel cell was manufactured by using the electrode prepared according to Preparation Example 2 and an anode described below, and an electrolyte membrane.

(1) Cathode

The electrode prepared according to Preparation Example 2 was cut to a size of 2.8 cm×2.8 cm and the resultant electrode was used as cathode.

(2) Anode

A catalyst slurry and an electrode having a thickness of 390 μm were prepared in the same manner as in Preparation Examples 1 and 2, respectively, except that 1 g of PtRu/C (manufacturer: TANAKA Precious metal (Japan)), 0.02 g of PVdF, and 5.0 g of NMP were used instead of PtCo/C (manufacturer: TANAKA Precious metal (Japan)), PVdF, NMP, and DHT that were used in the mixing ratio listed in Table 1. Then, the electrode was cut to a size of 2.8 cm×2.8 cm and the resultant electrode was used as a cathode.

(3) Electrolyte Membrane

A polybenzoxazine film having a thickness of 50 to 80 μm was used as an electrolyte membrane.

TABLE 1

|  | PtCo/C(g) | PVdF(g) | NMP(g) | DHT(g) |
|---|---|---|---|---|
| Example 1 | 1.0 | 0.02 | 4.95 | 0.05 |
| Example 2 | 1.0 | 0.02 | 4.75 | 0.25 |
| Example 3 | 1.0 | 0.02 | 4.5 | 0.5 |
| Example 4 | 1.0 | 0.02 | 4.0 | 1.0 |
| Comparative Example 1 | 1.0 | 0.02 | 5.0 | 0 |

EVALUATION EXAMPLE

Evaluation Example 1

Storage Stability of Catalyst Slurry

The catalyst slurries prepared according to Preparation Example 1 of Examples 1 to 4 and Comparative Example 1 were separately put into different vials and stored for 4 hours in the vials, respectively, and then, after 4 hours, a precipitation height of a catalyst material was observed with naked eyes to measure a precipitation speed of the catalyst material. The results are shown in FIG. 1.

Referring to FIG. 1, it was confirmed that the catalyst slurries prepared according to Examples 1 to 4 showed a slower precipitation speed than the catalyst slurry prepared according to Comparative Example 1. Lower precipitation speed means higher storage stability.

Evaluation Example 2

Pore Characteristics of Electrode

Figure 2:
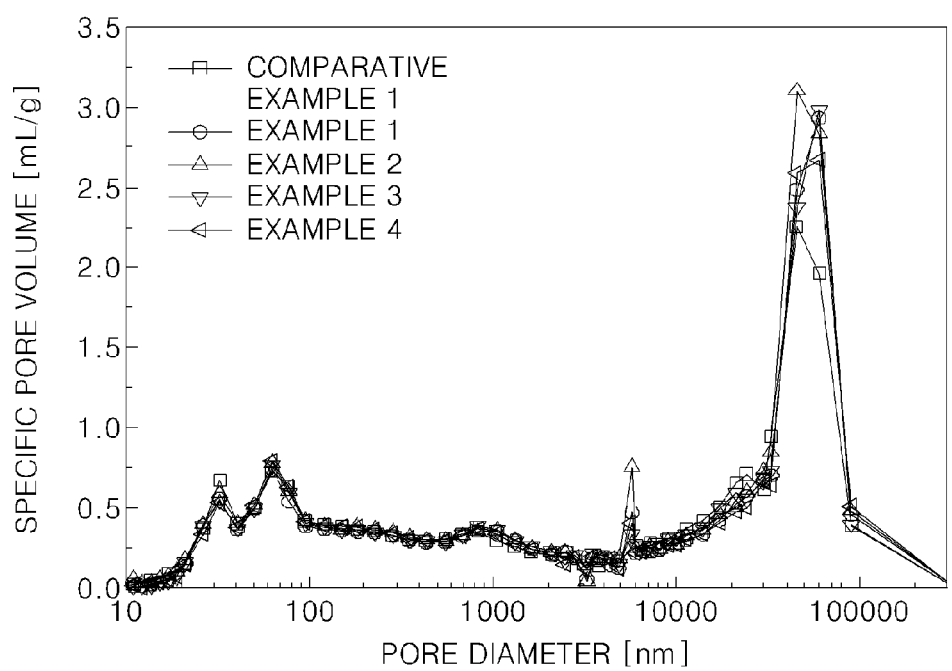
FIG. 2 is a graph of a specific pore volume with respect to the diameter of a pore formed in electrodes manufactured according to Examples 1-4 and Comparative Example 1.

The pore size distributions of the electrodes prepared according to Preparation Example 2 of Examples 1 to 4 and Comparative Example 1 were measured, and the results are shown in FIG. 2. The pore size distributions of the electrodes were measured by using a Hg porosimeter (AutoPore IV 9500, Micromeritics). Also, a total specific pore volume, and a specific pore volume of pores having a diameter of 50 to 100 μm of the each electrode are shown in Table 2 below.

TABLE 2

|  | Total specific pore volume($SV_T$) (mL/g) | Specific pore volume of pores having a diameter of 50 to 100 μm ($SV_L$) (mL/g) |
|---|---|---|
| Example 1 | 20.834 | 5.415 |
| Example 2 | 23.059 | 5.933 |
| Example 3 | 21.389 | 5.351 |
| Example 4 | 20.701 | 5.259 |
| Comparative Example 1 | 19.369 | 4.829 |

Referring to FIG. 2 and Table 2, it was confirmed that the electrode prepared according to Examples 1 to 4 had greater specific pore volumes of pores having a diameter of 50 to 100 μm than the electrode prepared according to Comparative Example 1.

Evaluation Example 3

Pt Amount Per Unit Area of Electrode

The electrodes were prepared in the same manner as in Preparation Example 2 of Examples 1 to 4 and Comparative Example 1 by using the catalyst slurries that were prepared according to Example 4 and Comparative Example 1, and then taken immediately, one hour, two hours, and three hours after the preparation thereof. Subsequently, a platinum (Pt) amount per unit area of each of the electrodes was measured and results thereof are shown in FIG. 3.

Figure 3:
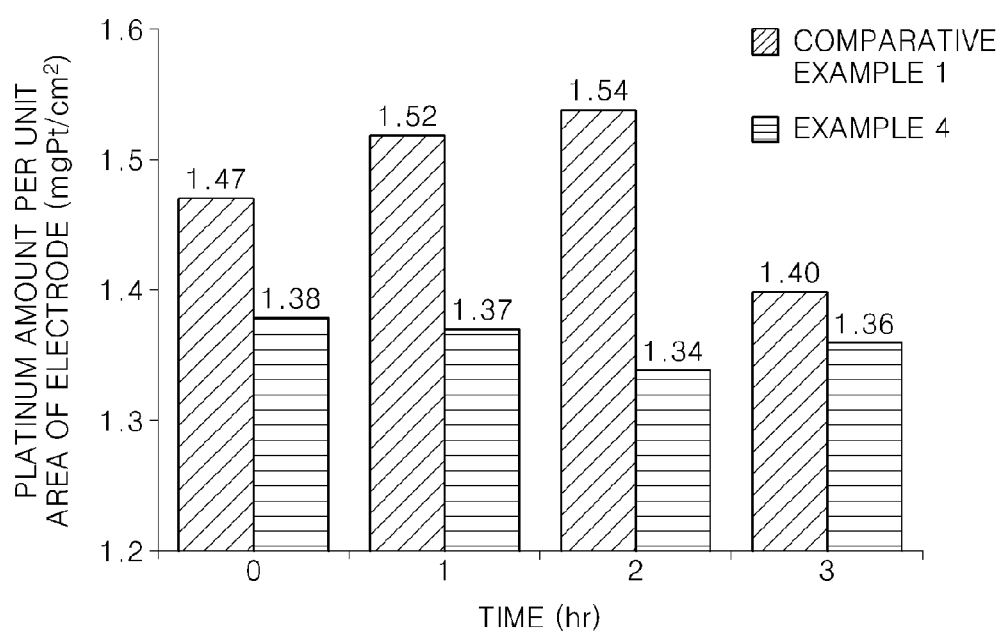
FIG. 3 is a graph of platinum amount per unit area of electrodes prepared by using catalyst slurries according to Example 4 and Comparative Example 1 which have been stored for different periods of time.

Referring to FIG. 3, it was confirmed that the electrode manufactured by using the catalyst slurry prepared according to Example 4 had a smaller deviation of a Pt amount per unit area of an electrode according to a storage time of a catalyst slurry than the electrode manufactured by using the catalyst slurry prepared according to Comparative Example 1. That is, referring to FIG. 3, a standard deviation of a Pt amount per unit area of the electrodes manufactured by using the catalyst slurry of Example 4 was 0.059, and a standard deviation of a Pt amount per unit area of the electrodes manufactured by using the catalyst slurry of Comparative Example 1 was 0.063. From these results, it was confirmed that an electrode manufactured by using a catalyst slurry according to an embodiment has a relatively uniform catalyst metal amount per unit area independently from a storage time of catalyst slurry, compared to an electrode manufactured by using a typical catalyst slurry. Accordingly, even when a catalyst slurry according to an embodiment is prepared in a large-scale and stored, it is easily expected that all of electrodes which are sequentially manufactured for a long period of time by using the catalyst slurry may have uniform performances.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A catalyst slurry for a fuel cell, the catalyst slurry comprising:
    a catalyst material;
    a binder; and
    a solvent comprising a first liquid for dissolving the binder and a second liquid having a viscosity that is higher than that of the first liquid,
    wherein a weight ratio of the second liquid with respect to the first liquid is in a range of about 20/80 to about 1/99;
    the second liquid is a material that is miscible with the first liquid and does not dissolve the binder;
    the first liquid is N-methylpyrrolidone and the second liquid is dihydroterpineol.

2. The catalyst slurry of claim 1, wherein the catalyst material comprises a carrier and a catalyst metal supported by the carrier.

3. The catalyst slurry of claim 2, wherein the carrier comprises at least one selected from carbon powder, carbon black, acetylene black, ketjen black, active carbon, carbon nanotube, carbon nanofiber, carbon nanowire, carbon nanohorn, carbon aerogel, carbon xerogel, and carbon nanoring.

4. The catalyst slurry of claim 2, wherein the catalyst metal comprises at least one selected from platinum (Pt), iron (Fe), cobalt (Co), nickel (Ni), ruthenium (Ru), rhodium (Rh), palladium (Pd), osmium (Os), iridium (Ir), copper (Cu), silver (Ag), gold (Au), tin (Sn), titanium (Ti), chromium (Cr), and an alloy of two or more of these.

5. The catalyst slurry of claim 1, wherein the binder comprises at least one selected from polyvinylidene fluoride (PVdF), polytetrafluoroethylene (PTFE), a vinylidenefluoride-hexafluoropropylene copolymer, and fluorine terminated phenoxide based hyperbranched polymer (HPEF).

6. The catalyst slurry of claim 1, wherein a viscosity of the first liquid is in a range of about 0.1 to about 10 cP, and a viscosity of the second liquid is in a range of about 10 to 100 cP.

7. The catalyst slurry of claim 1, wherein a weight ratio of the second liquid with respect to the first liquid is in a range of about 20/80 to about 10/90.

8. An electrode for a fuel cell, the electrode comprising:
an electrode support; and
a catalyst layer disposed on the electrode support,
wherein the catalyst layer is formed using the catalyst slurry of claim 1.

9. The electrode of claim 8, wherein the electrode has pores and a volume of pores having a diameter of about 50 to about 100 μm is in a range of about 5 to about 6 mL/g.

10. A fuel cell comprising:
a cathode;
an anode; and
an electrolyte membrane interposed between the cathode and the anode,
wherein at least one of the cathode and the anode is the electrode of claim 8.

\* \* \* \* \*